United States Patent
Christianson (10) Patent No.: US 6,648,376 B2
(45) Date of Patent: Nov. 18, 2003

(54) FLEXIBLE SECTIONED ARM WITH INTERNAL OVERBENDING-PREVENTION SLEEVES

(75) Inventor: Thomas R. Christianson, Napa, CA (US)

(73) Assignee: ShowerTek, Inc., Napa, CA (US)

( * ) Notice: Subject to any disclaimer, the term of this patent is extended or adjusted under 35 U.S.C. 154(b) by 0 days.

(21) Appl. No.: 10/109,831

(22) Filed: Mar. 29, 2002

(65) Prior Publication Data

US 2003/0184086 A1 Oct. 2, 2003

(51) Int. Cl.[7] .......................... F16L 27/04; F16L 11/00; B05B 15/08
(52) U.S. Cl. .................. 285/146.1; 138/120; 239/588; 285/144.1; 285/145.2
(58) Field of Search .......................... 285/144.1, 145.2, 285/146.1, 146.2, 146.3, 148.3, 123.15, 123.17, FOR 148, FOR 149, FOR 145; 138/120; 248/160; 403/144; 239/588

(56) References Cited

U.S. PATENT DOCUMENTS

| | | | |
|---|---|---|---|
| 203,094 A | 4/1878 | Wakeman | |
| 428,023 A | 5/1890 | Schoff | |
| 1,001,842 A | 8/1911 | Greenfield | |
| 1,255,577 A | 2/1918 | Berry | |
| 1,276,117 A | 8/1918 | Riebe | |
| 1,451,800 A | 4/1923 | Agner | |
| 1,500,921 A | * 7/1924 | Bramson et al. | 138/120 |
| 3,329,967 A | 7/1967 | Martinez et al. | |
| 3,584,822 A | * 6/1971 | Oram | 248/160 |
| 3,669,362 A | 6/1972 | Meyerhofer et al. | |
| 3,869,151 A | 3/1975 | Fletcher et al. | |
| 3,910,277 A | 10/1975 | Zimmer | |
| 4,282,612 A | 8/1981 | King | |
| 4,396,797 A | 8/1983 | Sakuragi et al. | |
| 4,545,081 A | * 10/1985 | Nestor et al. | 623/11 |
| 4,850,616 A | * 7/1989 | Pava | 285/41 |
| 4,865,362 A | 9/1989 | Holden | |
| 4,964,573 A | 10/1990 | Lipski | |
| 5,032,015 A | 7/1991 | Christianson | |
| 5,184,777 A | 2/1993 | Magnenat et al. | |
| 5,449,206 A | 9/1995 | Lockwood | |
| 5,517,392 A | 5/1996 | Rousso et al. | |
| 5,778,939 A | * 7/1998 | Hok-Yin | 285/264 |
| 5,865,378 A | 2/1999 | Hollinshead et al. | |
| RE36,883 E | * 9/2000 | Krenzel | 362/191 |
| 6,164,570 A | * 12/2000 | Smeltzer | 239/588 |

* cited by examiner

Primary Examiner—Eric K. Nicholson
(74) Attorney, Agent, or Firm—David Pressman (57) ABSTRACT

A flexible, sectioned plastic arm for a showerhead comprises a series of interconnected ball-and-socket (B&S) sections (10) with a proximal (shower pipe) end piece (12) and a distal (showerhead) end piece (14). Each B&S section has a proximal (cup or socket) end (10S) and a distal (ball) end (10B). The proximal end piece has a proximal end with female threads which can be screwed onto a shower pipe and a ball-shaped distal end for snapping into the socket of the most proximal section of the shower arm. The distal end piece has a proximal end with a socket for snapping onto the most distal end section of the shower arm and a distal end with male threads (12T) which can be screwed onto the showerhead. The arm has a through hole containing a series or chain of cylindrical brass or other metal sections, tubes, or sleeves (16). These prevent the arm from being bent too far, thereby to keep the B&S from separating. The two end tubes abut a pair of respective resilient spacers (18) or springs (18S), which in turn abut shoulders in the end pieces to keep the series of tubes in place. Inside the series of tubes is a flexible plastic tube (20) for carrying the water without leakage. A T-shaped end fitting (20T) is attached to each end of the plastic tube. These end fittings hold the tube in the arm. The top arm of the T of the distal end fitting sits in the bottom of the female threaded end of the proximal end piece. The top arm of the T of the distal end fitting sits on the very end of the male threaded end of the distal end piece.

30 Claims, 4 Drawing Sheets

FLEXIBLE SECTIONED ARM WITH INTERNAL OVERBENDING-PREVENTION SLEEVES

BACKGROUND OF THE INVENTION

1. Field of Invention

This invention relates generally to flexible arms, specifically to an arm which can support and carry water to a showerhead, yet which is rigid yet bendable.

2. Prior Art

Years ago all showerheads were attached directly to a rigid shower pipe that extended out of a wall or were otherwise supported. The showerhead sometimes had a pivot or swivel connection to the pipe. The pivot enabled the user to adjust the angle of the head and hence the direction of the sprayed water. However the head was fixed to the end of the pipe and was not moveable or translatable (adjustable in location) to accommodate users of different heights or to spray different areas of the body.

In recent years, many showerheads were attached to the pipe by a flexible showerhead arm that carried the water from the pipe to the head. Some arms were flexible but rigid enough to remain in any selected position. Such arms enabled the user to translate the position of the head to adjust the spray to the user's height, or to direct it to any desired part of the body. However such arms had various drawbacks, including leakage from the arm, inability to remain in the adjusted position, unreliability, complexity, etc.

Some flexible yet rigid arms were made of a series of mating ball-and-socket (B&S) sections that formed moveable joints. However these joints separated when the user tried to bend the arm too far, i.e., to less than a given angle or radius of curvature. U.S. Pat. No. 5,449,206 to Lockwood (1995) shows an arm with internal stops molded into the B&S sections to prevent such overbending and separation. However these stops made the shape of the B&S joints relatively complex and the stops themselves could break. In addition, this patent is still in force and its claims may cover some arms with stops.

OBJECTS AND ADVANTAGES

Accordingly, several objects and advantages of the invention are to provide an improved showerhead arm, an arm which will not leak, which is simple and reliable in construction, which is flexible yet which will stay in any position to which it is bent, which has joints which will not separate if the arm is bent beyond a given angle or radius, and which is not covered, insofar as I am aware, by the claims of any in-force patent. Other objects and advantages will become apparent from a consideration of the ensuing description and the accompanying drawings.

SUMMARY

In accordance with the invention, a flexible, sectioned plastic arm for a showerhead comprises a series of interconnected ball-and-socket (B&S) sections with a proximal (shower pipe) end piece and a distal (showerhead) end piece. Each B&S section has a proximal (cup or socket) end and a distal (ball) end. The proximal end piece has a proximal end with female threads which can be screwed onto a shower pipe and a ball-shaped distal end for snapping into the socket of the socket of the most proximal B&S section of the shower arm. The distal end piece has a proximal end with a socket for snapping onto the ball of the most distal end B&S section of the shower arm and a distal end with male threads that can be screwed onto the showerhead. The B&S sections have a through hole containing a series or chain of cylindrical brass or other metal sections, tubes, or sleeves. These prevent the arm from being bent too far, thereby to keep the B&S from separating. The two end sleeves abut a pair of respective resilient spacers or springs, which in turn abut shoulders in the end pieces to keep the series of tubes in place. Inside the series of tubes is a flexible plastic tube for carrying the water without leakage. A T-shaped end fitting is attached to each end of the black plastic tube. These end fittings hold the tube in the arm. The top arm of the T of the distal end fitting sits in the bottom of the female threaded end of the proximal end piece. The top arm of the T of the distal end fitting sits on the very end of the male threaded end of the distal end piece.

DRAWINGS

Figures

DRAWINGS

Reference Numerals

| | | |
|---|---|---|
| 10 B&S section | 10B ball end | 10C point of contact |
| 10E edge of ball | 10M mid-portion | 10S socket end |
| 12 proximal end piece | 12F flange | 12M mid-portion |
| 12P planar surface | 12R round portion | 12T threads |
| 12W wider section | 14 distal end piece | 14C cup distal end piece |
| 14C' outer rim | 14C" circular ridge | 14F flange |
| 14M mid-portion | 14N narrow portion | 14P planar surface |
| 14R round portion | 14S socket | 14T male threads |
| 16 plain metal sleeve | 16F flanged metal sleeve | 16E end flange |
| 16N notch | 16S split or gap | 18 resilient cushion |
| 18S spring spacer | 20 flexible tube | 20T T-shaped end fitting |
| 22 shroud | 22' alt. outer shroud | 22C' end of shroud |
| 24 B&S end section | 24C cylindrical part | 24F positioning flanges |

DETAILED DESCRIPTION

Preferred Embodiment

Figure 1:
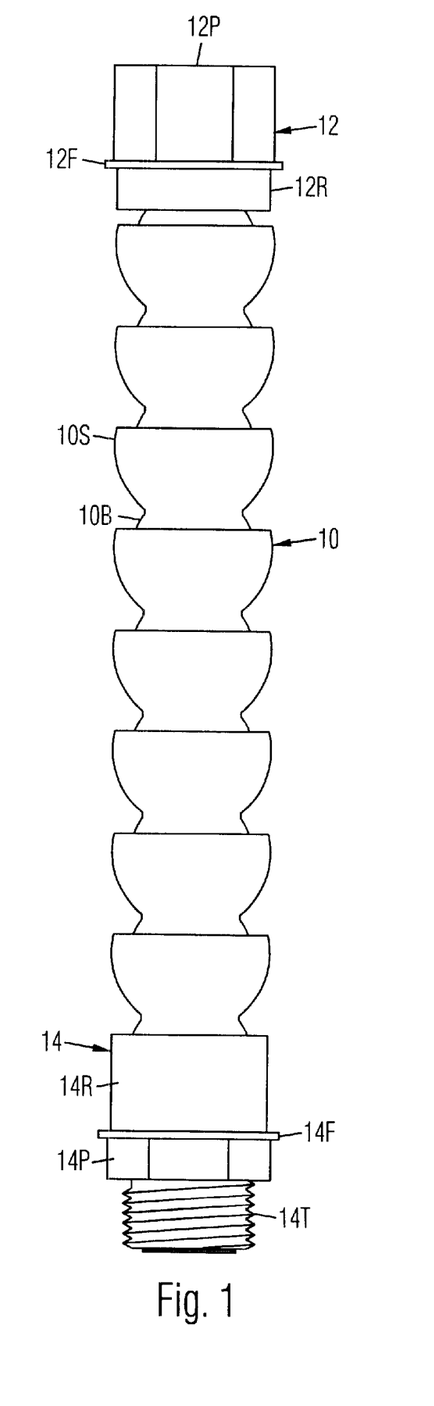
FIG. 1 is an overall view of a showerhead arm according to the invention.

FIG. 1—Outside View of Arm

FIG. 1 shows an outside view of a showerhead arm according to the invention. It comprises a series of ball-and-socket (B&S) sections 10. A shower pipe connection end section 12 is at what I call the proximal end since it is most proximate the water source. The arm also has a showerhead connection end piece 14 at what I call the distal end since it is most distant from the water source. Distal end piece 14 has a portion with male threads 14T. Both end pieces 12 and 14 have a round section with two planar or flat surfaces 12P and 14P (only one is viewable on each end piece). These enable the user to tighten or loosen the end piece with a wrench (not shown). Distal end piece 14 has a round and distal portion 14R, a middle flange 14F, a round portion adjacent flange 14F with planar portion 14P, and threaded portion 14T. Proximal end piece 12P also has, in addition to the portion with planar surface 12P, a middle flange 12F, and a distal round portion 12R. Each B&S section has a through hole and the sections and end pieces are arranged so that the through holes of the series of sections and end pieces communicate to provide a passageway or lumen through the entire arm.

Each B&S section 10 has a socket end 10S facing the shower pipe (not shown) at its proximal end and a ball end 10B facing the showerhead (not shown) at its distal end. A narrowed or neck portion 10N separates the ball end from the socket end of each section. The ball end of each section is fitted, mated, snapped into, or telescoped into the socket of the next section and is embraced by friction fit within such socket to give the arm rigidity. Such B&S sections are well known and form a bendable but rigid joint between each pair of adjacent sections. Due to the frictional fit of each ball in its socket, each joint will remain in any position or angle to which it is bent. However without the internal sleeves which I provide according to the invention (discussed infra), if any joint is bent too far, neck 10N of the ball of one section will hit the edge or skirt of the mating socket of the next section. Then if further bending is attempted, such edge will act as a fulcrum for the ball. This fulcrum will leverage the bending force, and the force will be levered, causing the ball to pry itself out of its socket. This will render the arm useless and probably destroy an inside tube (discussed infra), making it very difficult to replace the ball back in its socket.

Figure 2:
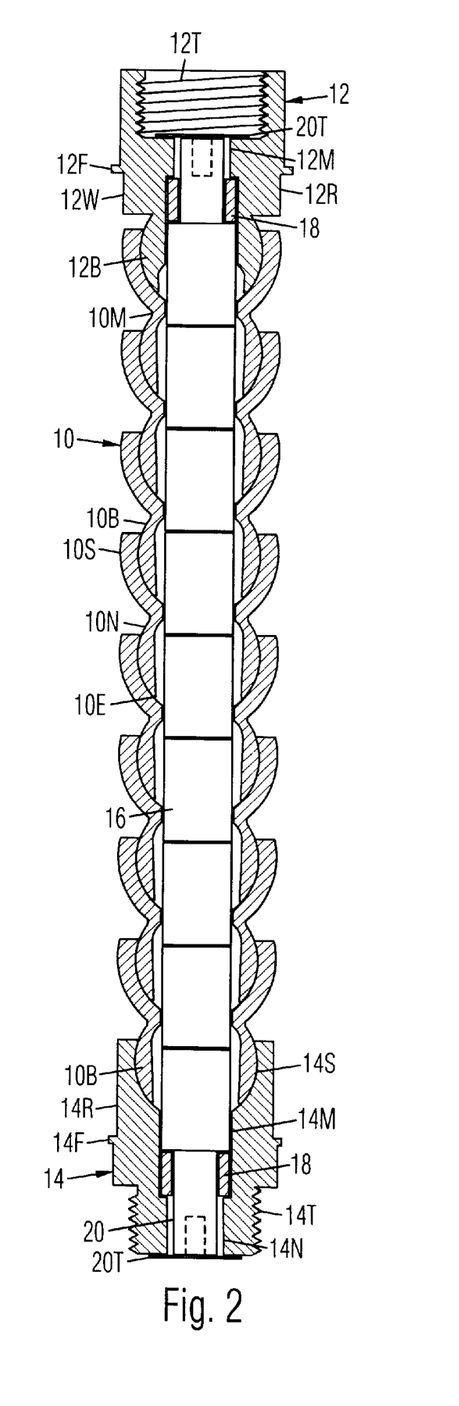
FIG. 2 is a cross-sectional view of the arm in a straight condition with internal bend-limiting plain sleeves.

FIG. 2—Cross-Section of Arm and End Piece

FIG. 2 shows a longitudinal cross section of the arm. Note how socket 10S of each B&S section embraces ball end 10B of the adjacent section and allows the ball end to be bent through a range of angles in the socket. Proximal end section 12 has internal or female threads 12T that mate with the male threads on the shower pipe (not shown). Both end sections 12 and 14 have a through hole, as does each B&S section. The trough hole or lumen of each B&S section starts wide at the open end of its socket 10S, then narrows to a constricted mid-portion 10M, and then enlarges slightly to a uniform diameter through its ball end 10B.

Positioned inside the through hole or lumen of the B&S sections is a series or chain of metal bend-limiting tubes, cylinders, or sleeves 16. Each sleeve is made of rust-resistant metal that is thin, yet thick enough to be rigid and withstand a force imposed upon it by the end or edge 10E of its surrounding ball end during bending, as will be discussed. The sections are contiguous or very close and are aligned with the surrounding B&S sections such that edge 10E of each ball 10B surrounds or is aligned with a mid-portion area of each sleeve 16.

At each end of the chain of sleeves 16 is a resilient spacer or cushion 18. Each cushion is a cylinder or annulus and is preferably made of rubber, dense foam, or any other resilient material.

Returning to the end pieces, distal end piece 14 has a through hole for the passage of water and to hold ball 10B of the adjacent B&S section and to hold sleeve 16 and cushion 18. Specifically, the through hole, starting from the bottom or distal end, has a narrow distal end section 14N which holds a plastic tube, to be discussed. The outside of section 14N has male threads 14T, previously discussed. The distal end piece next has a somewhat wider midsection 14M which holds cushion 18 and the end of the bottommost sleeve 16. Finally it has a still wider section or socket 14S at its proximal end, which mates with and allows ball 10B of the last B&S section to swivel. The junction of distal end sections 14N and midsection 14M forms an upwardly facing circular ledge that holds cushion 18 in place to prevent it from moving down and out of the end piece.

Similarly, proximal end piece 12 has, starting from the top or proximal end and moving down, a relatively wide section with female threads 12T, previously discussed, which mate with the shower pipe. Next a relatively narrow midsection 12M holds plastic tube 20, to be discussed. Finally, at its distal end, the end piece has a somewhat wider section 12W which holds cushion 18 and the end of the topmost sleeve 16. The junction of midsection 12M and wider section 12W forms an downwardly facing circular ledge that holds cushion 18 in place to prevent it from moving up and out of the end piece. A ball section 12B extends from round portion 12R of end piece 12.

Flexible plastic tube 20 extends through the arm, from the bottom end of distal end piece 14 to the bottom of the wide section with female threads 12T in proximal end piece 12. Tube 20 is stretchable and narrower than the inside diameter of metal sleeves 16 so that it can move in the lumens of such tubes.

Tube 20 is held in the arm by two T-shaped end fittings 20T. Each fitting 20T has a top horizontal arm and a vertical leg. The top horizontal arm on distal fitting 20T is shown at the very bottom of distal end piece 14, and the top horizontal arm on proximal fitting 20T is shown at the bottom of the wide section with female threads 12T. The vertical leg of distal fitting 20T is shown in broken lines inside the bottom end of tube 20 inside threads 14T; it is also adjacent and attached to the fitting's top horizontal arm. The vertical leg of proximal fitting 20T is shown in broken lines inside the top end of tube 20; it is also adjacent and attached to the fitting's top horizontal arm. The vertical leg of each fitting is force fit in its end of tube 20 and has a barb or flange bulge (not shown), so that the end sections of the tube grasp the legs securely.

All parts have a circular cross section and are circularly symmetrical, except for the two planar surfaces 12P and 14P on each end piece. In one presently preferred embodiment the end pieces and the B&S sections were made of acetal copolymer plastic. Round sections 12R and 14R each had a diameter of 2.54 cm and lengths of 10 cm and 1.3 cm, respectively. Flanges 12F and 14F each had a diameter of 3.175 cm, and the sections with planar surfaces 12P and 14P had a diameter of 2.778 cm and lengths of 1.3 cm and 10 cm, respectively. Tube 20 had an outside diameter of 0.83 mm and was made of black polyethylene that was 0.8 mm thick. Metal sleeves 16 each were made of brass 0.635 mm thick with an outside diameter of 1.087 cm and a length of 1.778 cm. The arm was about 38 cm long. All other parts were sized proportionately.

The arm was assembled by first inserting cushions 18 into the end pieces and inserting one T-fitting 20T into one end of tube 20. Then the B&S sections were snapped together and into one end piece. Then the chain of sleeves 16 was inserted. Next the other end piece was snapped on and plastic tube 20 was inserted, with the end without the T-fitting first. The plastic tube was cut several cm longer than necessary so that it protruded out of the arm. Then the protruding end was pulled to stretch the tube. While stretched it was held adjacent the end of the arm and most of the protruding portion was cut off. The second T-fitting was inserted, and the tube was released so that it shrunk back into the arm to its normal length and the second T-fitting moved into position adjacent the end piece.

Operation

Figure 3:
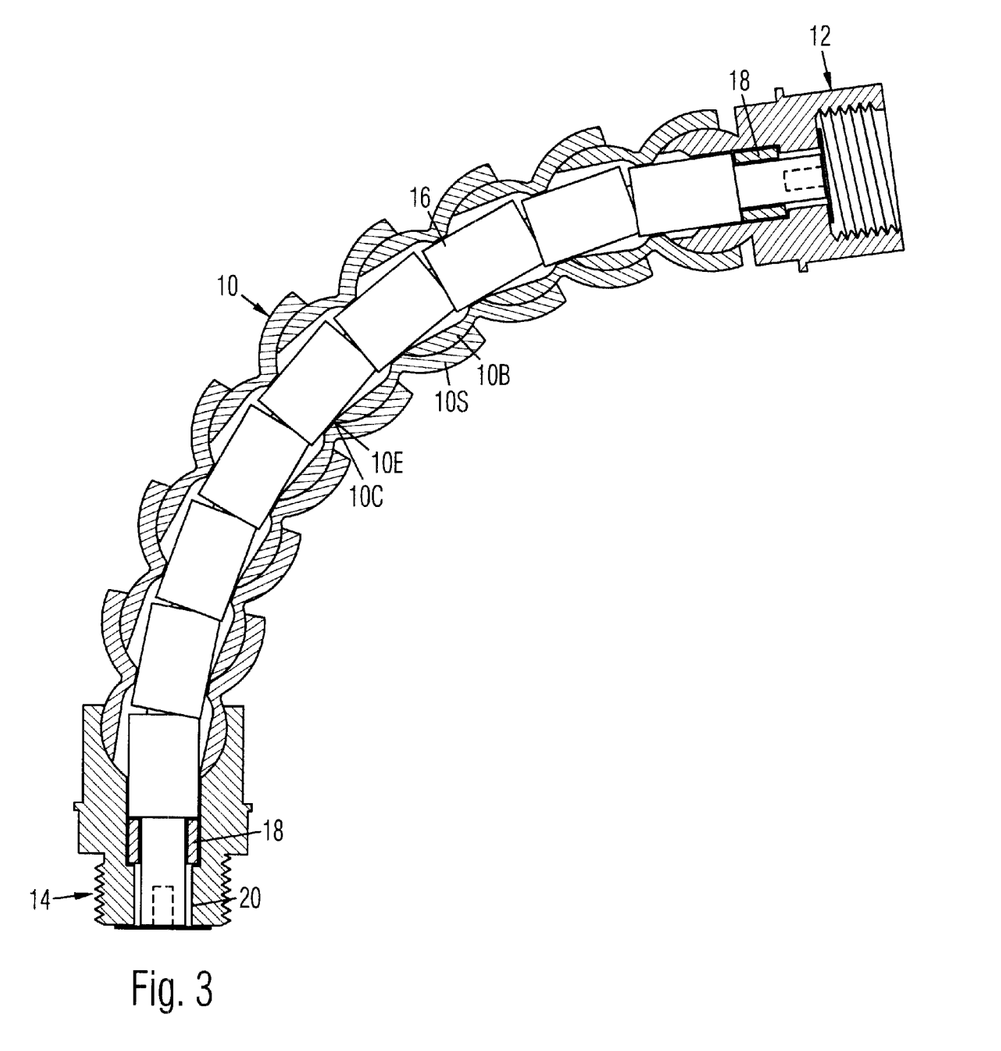
FIG. 3 is a cross-sectional view of the arm of FIG. 2 in a maximally bent condition.

FIGS. 1–3

The arm of FIGS. 1 to 3 operates and is used as follows: It is installed between a shower pipe and a showerhead, neither of which is shown but are well known. It can be installed by removing the existing showerhead and screwing end piece 12 onto the shower pipe. The installer should use suitable pipe dope or PFTE tape and a resilient washer (not shown) to seal the threads in a well-known manner and a wrench (not shown) on planar surfaces 12P to tighten the end piece. Then the showerhead is screwed onto male threads 14T in a similar manner. The user can now adjust the arm to a range of positions. It will remain in any position due to friction in the joints and it will carry water without leakage due to plastic tube 20.

When the use bends the entire arm, e.g., as shown in FIG. 3, each ball end 10B will swivel with respect to its socket end 10S as indicated. Plastic tube 20 and the chain of sleeves 16 will also bend with the B&S sections, as shown. Note how the outer ends of sleeves 16 separate upon bending and the inner ends are jammed together. The chain of sleeves will expand during such bending, but spacers 18 will accommodate such expansion by allowing the sleeves compress the spacers. The spacers hold the sleeves in proper position and keep the series of sleeves from shifting position, regardless of its length.

When the arm is bent far enough, the edges of ball ends 10B will swivel or pivot far enough to contact the outside of the adjacent sleeve or metal tube 16, as indicated at points of contact 10C. The chain or series of sleeves is positioned so that at least one end of each B&S sections is adjacent and surrounds a wall portion of a sleeve between its opposite ends, so that when the arm is bent, one end of at least one B&S section will contact and press against a sleeve's wall portion. When such contact occurs, the metal tube or sleeve stops any further swiveling of the ball end in its socket, so the user cannot bend each joint farther unless great force is used. As a result of the sleeves' overbending prevention function, the ball ends cannot be swiveled far enough to cause the ball of one section to hit the edge or skirt of its socket and pry itself out of its socket. Thus the user cannot easily overbend the arm or cause any ball to be pried out of its socket.

When the arm is straightened back, the sleeves will resume their normal orientation, as shown in FIG. 2. The spacers will expand evenly to keep the chain of sleeves in position, i.e., the midsections of the sleeves will remain aligned with the edges of the respective ball ends.

If the user bends only one or several joints of the arm (not shown) the sleeves will prevent overbending in the same manner, except that fewer sleeves will be involved.

Figure 4:
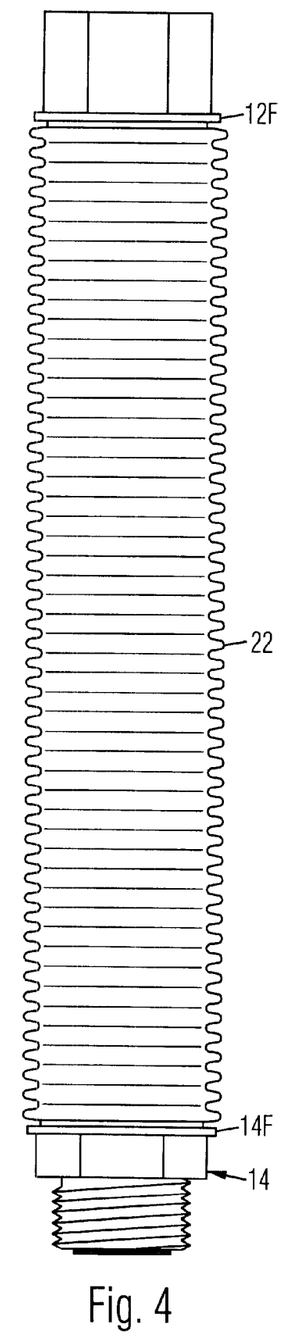
FIG. 4 is an overall view of the arm with a flexible cover.

FIG. 4—Arm With Shroud

To enhance the arm's aesthetic appearance, it can be provided with a shroud or cover 22 (FIG. 4). This shroud is made of corrugated flexible plastic about 3 cm in outside diameter with flange corrugating sections about 2 mm wide, spaced apart about 1 mm, and about 2 mm deep. The shroud is positioned between and held by flanges 12F and 14F. It can be installed after the B&S sections are snapped together and to one end piece, but before the second end piece is installed.

Figure 5:
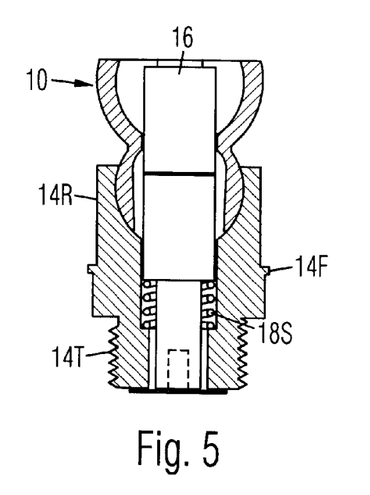
FIG. 5 is a cross-sectional view of a distal end of the arm with a spring spacer.

FIG. 5—Spring Cushion

In lieu of a solid cushion 18, a spring spacer 18S (FIG. 5) can be used, preferably at both ends, but optionally at one end. Spring 18S has a helicoidal, cylindrical configuration and, like cushion 16, has the same outside diameter as tubes 16 to hold the chain of tubes in place. When the arm is bent, the chain of tubes will expand as before (FIG. 3) and compress spring(s) 18S (compressed state of springs not shown). When the arm is straightened back, the spring(s) will urge the chain of tubes back to their original configuration (FIG. 2).

Figure 6A:
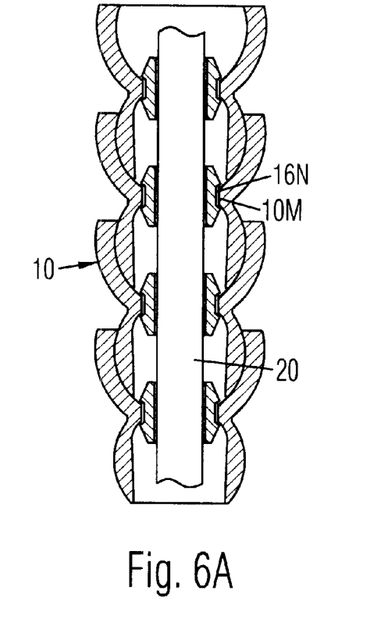
FIG. 6A is a cross-sectional view of the arm in a straight condition with alternative flanged spacers of the type shown in the perspective view of FIG. 6B.
Figure 6B:
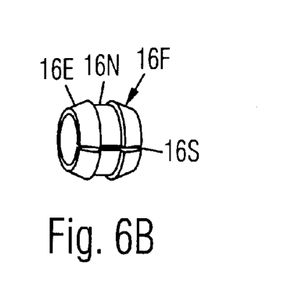

FIG. 6—Flanged Bend-Limiting Sleeve

As an alternative to the metal plain bend-limiting sleeves 16 of FIG. 2, the flanged sleeves 16F of FIG. 6B can be used and can be made of acetal copolymer plastic. Each sleeve is a cylinder with an axial gap or split 16S and a pair of end flanges 16F. Each end flange comprises a thicker portion of the cylinder which has an abrupt step or shoulder facing the other flange and which tapers to the outer end. The flanges form a notch 16N between the facing shoulders of the flanges. Preferably these sleeves are made of acetal copolymer plastic and are 1 mm thick in the center with an outside diameter in the center of 1 cm, a length of 1.5 cm. Each flange 16F was about 1.8 mm thick at its thickest portion and tapered to a thickness of 1 mm at its end, and was about 8.75 mm long. Gap 16S was 0.75 mm wide. As shown in FIG. 6A, sleeves 16B are positioned over flexible tube 20 at spaced locations such that the constricted midsection 10M of each B&S section is positioned in notch 16N of a respective sleeve. The sleeves can easily be installed in these positions by inserting them individually from one end, over tube 20, and pushing each sleeve down with a pusher tube (not shown) until its notch 16N snaps onto a constricted midsection 10M. The tapers of the end flanges enable the sleeves to be pushed past the constricted midsection and into position. The sleeves are held in position by midsections 10M.

When the arm is bent (not shown), the end of each ball portion in the bent area will hit and be limited from further bending by its adjacent flanged sleeve 16F. Thus the flanged sleeves will limit the degree of bending of the arm to prevent separation of any of the B&S sections.

Figure 7:
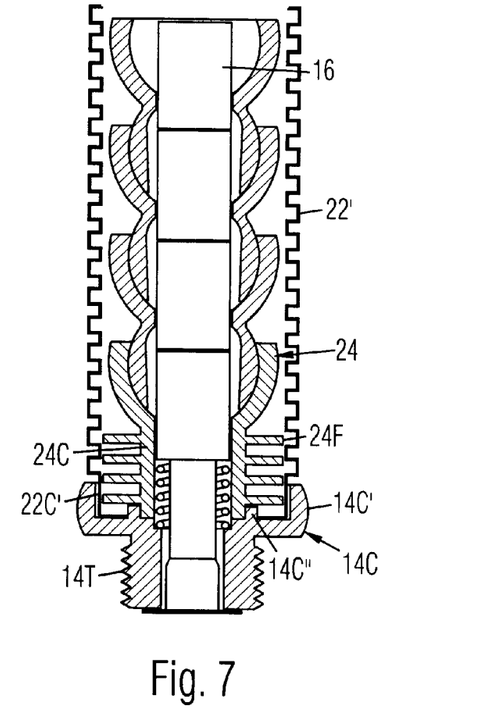
FIG. 7 is a cross-sectional view of an arm with an alternative distal end piece and an alternative pivotable end section.

FIG. 7—Alternative Distal End Piece and B&S End Section

As an alternative to distal end piece 14 of FIG. 2, a smaller and cup-shaped distal end piece 14C can be used, as shown in FIG. 7. This end piece requires less plastic. It is circular and has the same male threaded end 14T for mating with the female threads of a showerhead (not shown). Its proximal part has no socket, but comprises a cup-shaped portion that is shorter than the distal portion of FIG. 2 and has an outer rim 14C' and a concentric inner circular ridge 14C" for positioning a new bottommost pivotable end section 24. Section 24 is not a B&S section since it has no ball portion. Its distal portion is socket shaped, like the B&S sections of FIG. 2, and allows the ball of the next section to pivot in this socket. However its distal portion has no ball, but instead an elongated cylindrical part 24C, the distal end of which extends into and is surrounded by ridge 14C". End piece 14C preferably is attached to bottommost pivotable section 24 by ultrasonic welding. The cylindrical part of section 24 has a series of spaced positioning flanges 24F that position or hold the end of outer shroud 22'. The distal end of shroud 22' has a cylindrical portion 22C that extends between flanges 24F and rim 14C'.

Conclusion, Ramifications, and Scope

Accordingly the reader will see that, according to the invention, I have provided an improved showerhead arm which will not leak, which is simple and reliable in construction, which is flexible yet which will stay in any position to which it is bent, which has joints which will not separate if the arm is bent beyond a given angle or radius, and which I believe is not covered by any in-force patent.

While the above description contains many specificities, these should not be construed as limitations on the scope of the invention, but as exemplifications of the presently preferred embodiments thereof. Many other ramifications and variations are possible within the teachings of the invention.

For example the arm can be made of other materials than shown, it can have other dimensions, and its parts can have other shapes.

In addition to being used as a showerhead arm, it can be used for other purposes, such as a lamp holder (gooseneck), a microphone holder, an arm for a faucet, a hose for a gas or other fluid, etc. The flexible tube can provide insulation for electrical uses. In can also be used as a work holder—in this case tube 20 can be eliminated.

The plain metal sleeves of FIG. 2 can be spaced slightly or in contact with each other. In lieu of plain metal sleeves or flanged and split sleeves, sleeves of other shapes can be used. Cushion or spacer 18 can be eliminated and sleeves 16 can be abutted against the shoulders in the end pieces, at some loss of flexibility. Only one cushion or spacer can be provided, in which case the series of sleeves will shift in position toward the cushion upon bending of the arm, but the sleeves still should be long enough and have a suitable initial position so that they will not be shifted out of a functional position.

The corrugated cover can be eliminated or a shrink-fit cover or a plain cover can be used.

The ball and socket orientations of the B&S sections can be reversed so that the ball of each section is proximal and the socket is distal. In lieu of B&S sections, any other type of flexible joint-providing or swivelable sections can be used, such as a series of cylindrical sections which are not telescoped and merely abut each other and are held together by an internal cord. While I prefer that the edge of the ball end of the B&S sections contact the middle or midsection of the sleeves when the arm is bent, the sleeves will also stop excessive bending of the arm if such edge contacts any other portion of the sleeve. While a sleeve should be provided adjacent the end of each ball end, some or most of the sleeves can be omitted and the sleeves can be arranged, e.g., with larger cushions, so that only some of the ball ends are adjacent sleeves. In this case, the sleeves will prevent overbending of the arm only in the section with sleeves.

Thus the scope of the invention should be determined by the appended claims and their legal equivalents, and not by the examples given.

I claim:

1. A flexible arm, comprising:
   a series or chain of interconnected sections, each of said sections having opposite ends, said series of interconnected sections forming a plurality of pairs of such interconnected sections,
   each adjacent pair of interconnected sections being bendable at the interconnection of such pair,
   each of said interconnected sections having a through hole or lumen, said interconnected sections being arranged so that the through holes of said sections communicate to provide a continuous passageway through said series of interconnected sections,
   a series or chain of sleeves positioned in said lumen of said series of interconnected sections,
   each sleeve having a pair of opposite ends and a wall portion between said pair of opposite ends of each sleeve, one end of each of a plurality of said sleeves being adjacent the other end of an adjacent sleeve,
   said series of sleeves being positioned so that at least one end of each of at least a plurality of said interconnected sections is adjacent and surrounds said wall portion of a respective sleeve between said opposite ends thereof, so that when said arm is bent, said one end of at least one section will contact and press against said wall portion of its respective sleeve between said opposite ends thereof,
   whereby said sleeves will prevent bending of at least a portion of said arm beyond a given amount and thus will prevent separation of any of said pairs of said interconnected sections.

2. The flexible arm of claim 1 wherein said series of sleeves is sufficient in number so that at least one end of ear of said interconnected sections is adjacent a respective sleeve.

3. The flexible arm of claim 1, further including resilient means for allowing said series of sleeves to expand when said arm is bent, while keeping said series of sleeves from substantially shifting in position in relation to said interconnected sections.

4. The flexible arm of claim 3 wherein said resilient means comprises a pair of cushions at the respective ends of said series of sleeves and holding means for holding said pair of cushions in said arm.

5. The flexible arm of claim 3 wherein said resilient means comprises a pair of springs at the respective ends of said series of sleeves and holding means for holding said pair of springs in said arm.

6. The flexible arm of claim 1, further including a resilient spacer for allowing said series of sleeves to expand in length when said arm is bent, while keeping said series of sleeves from shifting in position in relation to said interconnected sections.

7. The flexible arm of claim 1 wherein said interconnected sections each comprises a ball at one end and a socket at the opposite end, the ball of each section being mated with the socket of an adjacent section.

8. The flexible arm of claim 7 wherein said interconnected sections are made of plastic and said sleeves are made of metal.

9. The flexible arm of claim 7 wherein an end one of said interconnected sections contains means for positioning or holding an outer shroud for surrounding said interconnected sections.

10. The flexible arm of claim 1, further including a flexible tube within said series of sleeves for conveying a fluid in said flexible arm.

11. The flexible arm of claim 1, further including a pair of end sections at the respective opposite ends of said series of interconnected sections, each of said end sections being bendably connected to an adjacent interconnected section, one of said end sections having a ball-shaped end which is mated to an adjacent section, the other end section having a socket which is mated to an adjacent section, each of said end sections containing a stop for preventing said series of sleeves from translating out of said arm.

12. The flexible arm of claim 11, further including resilient means for allowing said series of sleeves to expand in length when said arm is bent, while keeping said series of sleeves from shifting out of a functional position.

13. The flexible arm of claim 11, further including a resilient spacer for allowing said series of sleeves to expand in length when said arm is bent, while keeping said series of sleeves from shifting out of a functional position.

14. The flexible arm of claim 1 wherein said sleeves of said series each comprises a metal cylinder.

15. The flexible arm of claim 1 wherein said sleeves of said series each comprises a cylinder with a pair of flanged ends having a greater diameter than the portion of said cylinder intermediate said flanged ends.

16. The flexible arm of claim 15 wherein said sleeves of said series are separated so that a gap exists between adjacent sleeves.

17. The flexible arm of claim 15 wherein each of said interconnected sections has a constricted portion, each of said sleeves of said series being positioned so that its wall portion intermediate said flanged ends mates with said constricted portion of a respective one of said sections.

18. A flexible arm, comprising:
   a series or chain of interconnected and mutually pivotable sections,
   each of said sections having a ball-shaped first end and a socket-shaped second and opposite end,
   the end of each ball section comprising an edge,
   each interconnected and mutually pivotable section having a through hole,
   said interconnected and mutually pivotable sections being arranged so that the through holes of said sections communicate to provide a continuous passageway or lumen through said series of sections,
   each interconnected and mutually pivotable section being mated with an adjacent section so that said ball end of each section is mated with the socket end of each adjacent section,
   a series of sleeves positioned in said lumen of said series of interconnected and mutually pivotable sections,
   each of said sleeves having a pair of opposite ends and a wall portion between said opposite ends,
   said sleeves being positioned and dimensioned so that said edge of each of said ball ends is adjacent said wall portion of a respective sleeve, and such that when said arm is bent, at least one of said edges will contact and press against said wall portion of a respective sleeve, and said sleeve will prevent bending of at least a portion of said arm beyond a given amount and thus will prevent separation of any of said balls from its socket.

19. The flexible arm of claim 18, further including resilient means for allowing said series of sleeves to expand in length when said arm is bent, while keeping said series of sleeves from shifting in position in relation to said interconnected and mutually pivotable sections.

20. The flexible arm of claim 19 wherein said resilient means comprises a pair of cushions at the respective ends of said series of sleeves' and means for holding said pair of cushions in said arm.

21. The flexible arm of claim 19 wherein said resilient means comprises a pair of springs at the respective ends of said series of sleeves and means for holding said pair of springs in said arm.

22. The flexible arm of claim 18, further including a resilient spacer for allowing said series of sleeves to expand in length when said arm is bent, while keeping said series of sleeves from shifting in position in relation to said interconnected sections.

23. The flexible arm of claim 18, further including a flexible tube within said chain of sleeves for containing a fluid in said arm, and also further including a pair of end sections at the respective opposite ends of said series of interconnected pivotable sections, each of said end sections being pivotably connected to an adjacent pivotable section, one of said end sections having a ball-shaped end which is mated to an adjacent pivotable section, the other end section having a socket which is mated to an adjacent pivotable section, each of said end sections containing a stop for preventing said series of sleeves from translating out of said arm.

24. The flexible arm of claim 23 wherein an end one of said interconnected pivotable sections contains means for positioning or holding an outer shroud.

25. The flexible arm of claim 18 wherein said sleeves of said series each comprises a metal cylinder.

26. The flexible arm of claim 18 wherein said sleeves of said series each comprises a cylinder with a pair of flanged ends having a greater diameter than said wall portion of said cylinder intermediate said flanged ends.

27. The flexible arm of claim 26 wherein said sleeves of said series are separated so that a gap exists between adjacent sleeves.

28. The flexible arm of claim 26 wherein each of said interconnected and mutually pivotable sections bas a constricted portion, each of said sleeves of said series being positioned so that its wall portion intermediate said flanged ends mates with said constricted portion of a respective one of said sections.

29. A flexible arm, comprising:
   a series of adjacent mutually pivotable sections,
   each mutually pivotable section having a ball-shaped first end and a socket-shaped second end,
   said first end of each section being inserted and pivotable in said second end of an adjacent section,
   each of said pivotable sections having a through hole therethrough,
   said through hole of each of said pivotable sections terminating in an opening at an end of said ball-shaped first end, said opening having an edge,
   the through holes of said pivotable sections being aligned so as to form a continuous through hole or lumen through said series of adjacent pivotable sections,
   first and second end sections at the respective ends of said series of adjacent pivotable sections,
   said first end section having a first end with a socket,
   said ball-shaped first end of one of said pivotable sections at one end of said series of adjacent pivotable sections being inserted into said socket,
   said second of end sections having a first end with a ball which is inserted in said socket-shaped second end of one of said pivotable sections at the opposite end of said series of pivotable sections,
   said first and second end sections having a through hole therethrough which is aligned with said through hole or lumen through said series of adjacent pivotable sections so as to form a through hole or lumen through said series of adjacent pivotable sections and said first and second end sections, and thereby said flexible arm,
   a series of rigid sleeves positioned in said lumen in said arm so that one of said sleeves is adjacent an edge of a respective one of said pivotable sections so that if said arm is bent, an edge of at least one pivotable section will contact a respective sleeve and said sleeve will thereby be prevent said arm from overbending at said pivotable section,
   said through hole in said first and second end sections having a relatively wide part at the end of each end section facing said series of adjacent pivotable sections and a relatively narrow part at the opposite end of each end section, said relatively wide part being joined to said relatively narrow part by a ledge facing said series of adjacent pivotable sections, said sleeves having an outside dimension which is equal to or less than the dimension of said relatively wide part of said first and second end sections and larger than the dimension of said relatively narrow part of said first and second end sections, one of said sleeves at one end of said series of rigid sleeves being inserted into said relatively wide part of said first end section, one of said sleeves at said opposite end of said series of rigid sleeves being inserted into said relatively wide part of said second end section, whereby said series of rigid sleeves will be retained in said arm and will prevent said arm from overbending and thus will prevent separation of any of said balls from its socket.

30. The flexible arm of claim 29, further including at least one resilient spacer in at least one of said first and second end sections between said one of said sleeves at one of said ends of said series of rigid sleeves for allowing said series of sleeves to expand in length when said arm is bent while keeping said series of sleeves from shifting out of a functional position.

* * * * *

UNITED STATES PATENT AND TRADEMARK OFFICE
CERTIFICATE OF CORRECTION

PATENT NO.    : 6,648,376 B2
DATED         : November 18, 2003
INVENTOR(S)   : Christianson, T.R.

It is certified that error appears in the above-identified patent and that said Letters Patent is hereby corrected as shown below:

<u>Title page,</u>
Item [57], ABSTRACT,
Line 16, after "B&S" insert -- sections --.

<u>Column 8,</u>
Line 8, change "ear" to -- each --.

<u>Column 10,</u>
Line 20, change "bas" to -- has --.

Signed and Sealed this

Third Day of February, 2004

JON W. DUDAS
*Acting Director of the United States Patent and Trademark Office*